Nov. 10, 1953  G. R. McALLASTER  2,658,276
MECHANISM FOR MARKING AND CUTTING TROUSERS
Filed Sept. 30, 1950  5 Sheets-Sheet 1
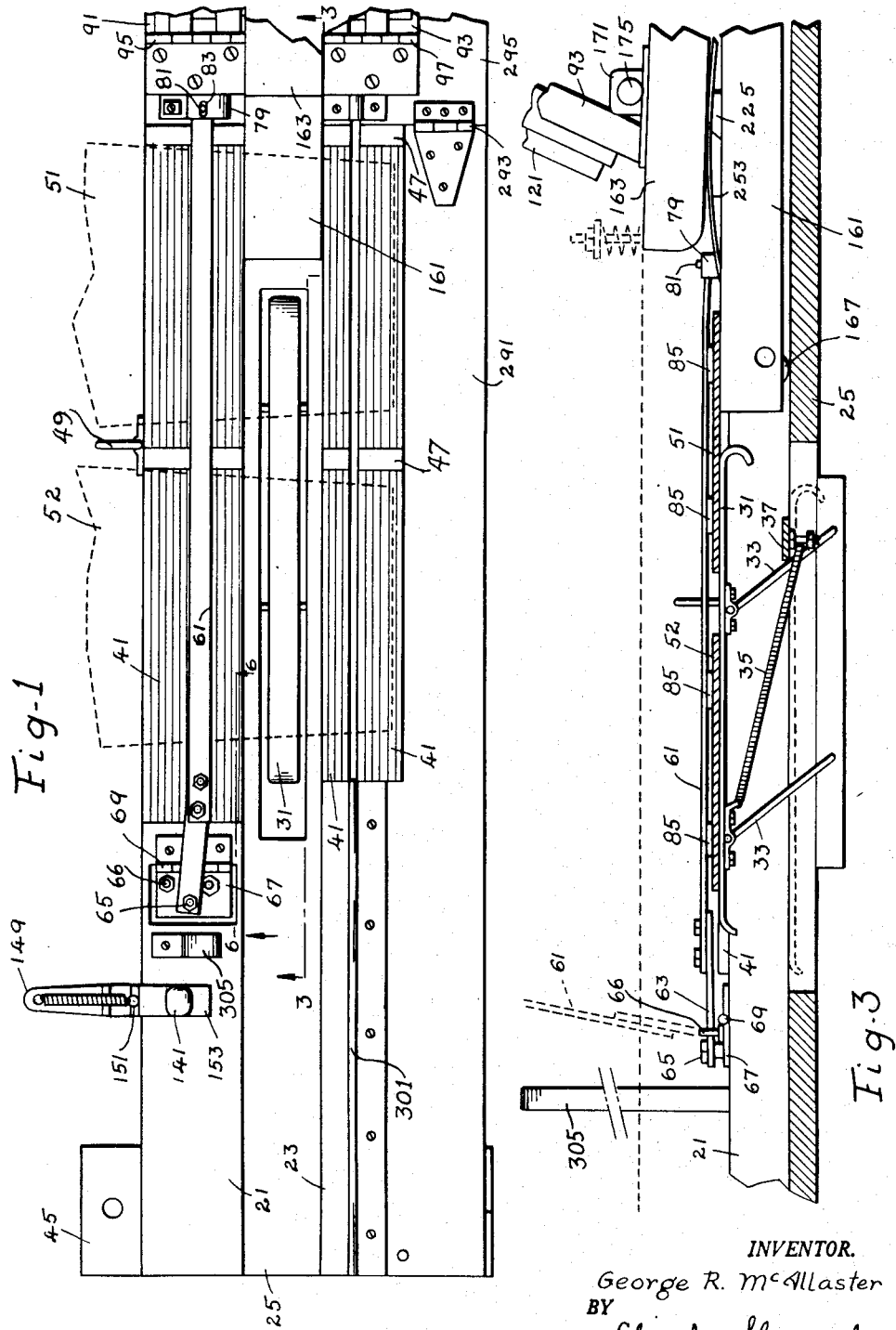
INVENTOR.
George R. McAllaster
BY
Charles Shepard
ATTORNEY

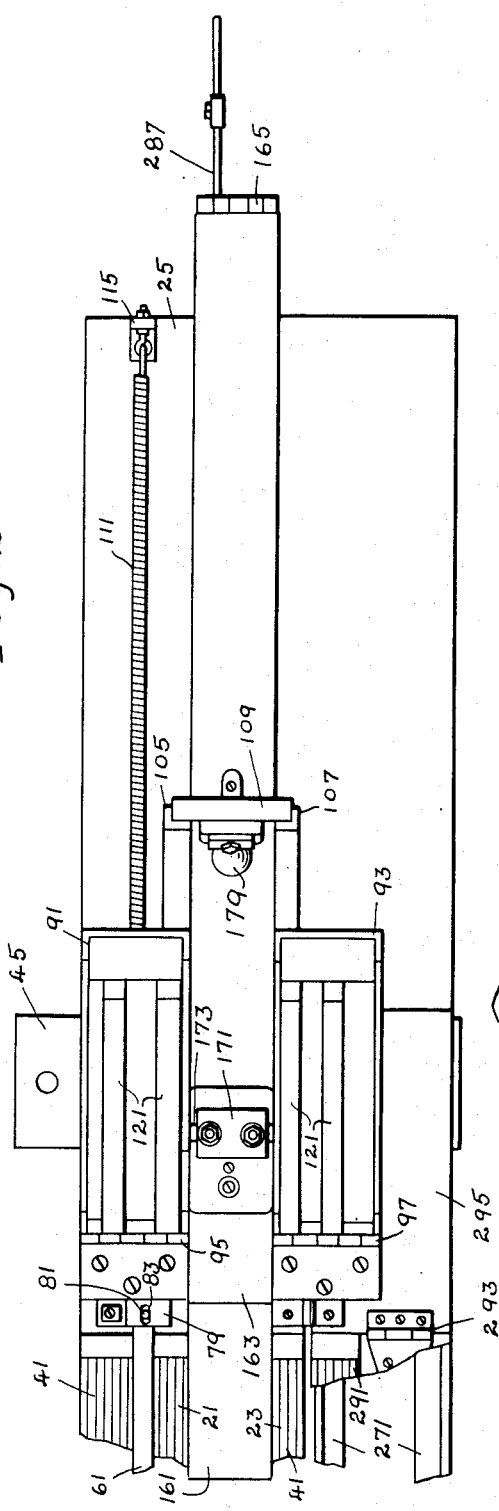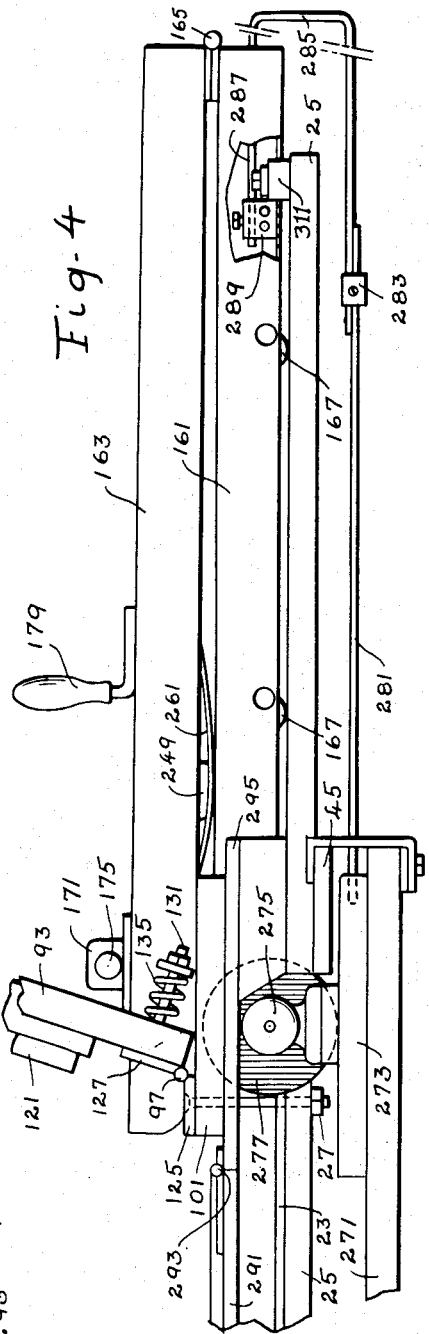

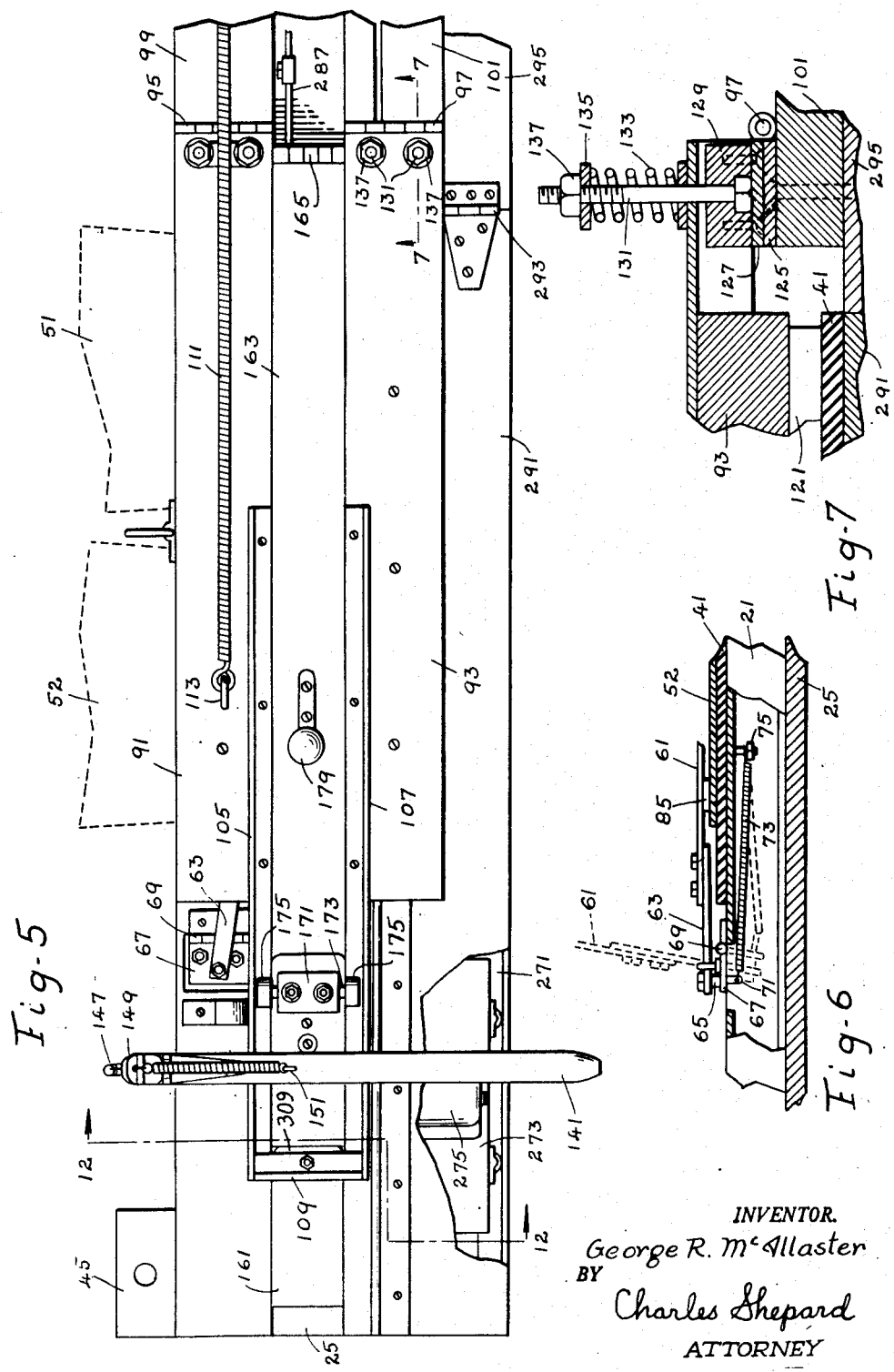

Nov. 10, 1953 G. R. McALLASTER 2,658,276
MECHANISM FOR MARKING AND CUTTING TROUSERS
Filed Sept. 30, 1950 5 Sheets-Sheet 4
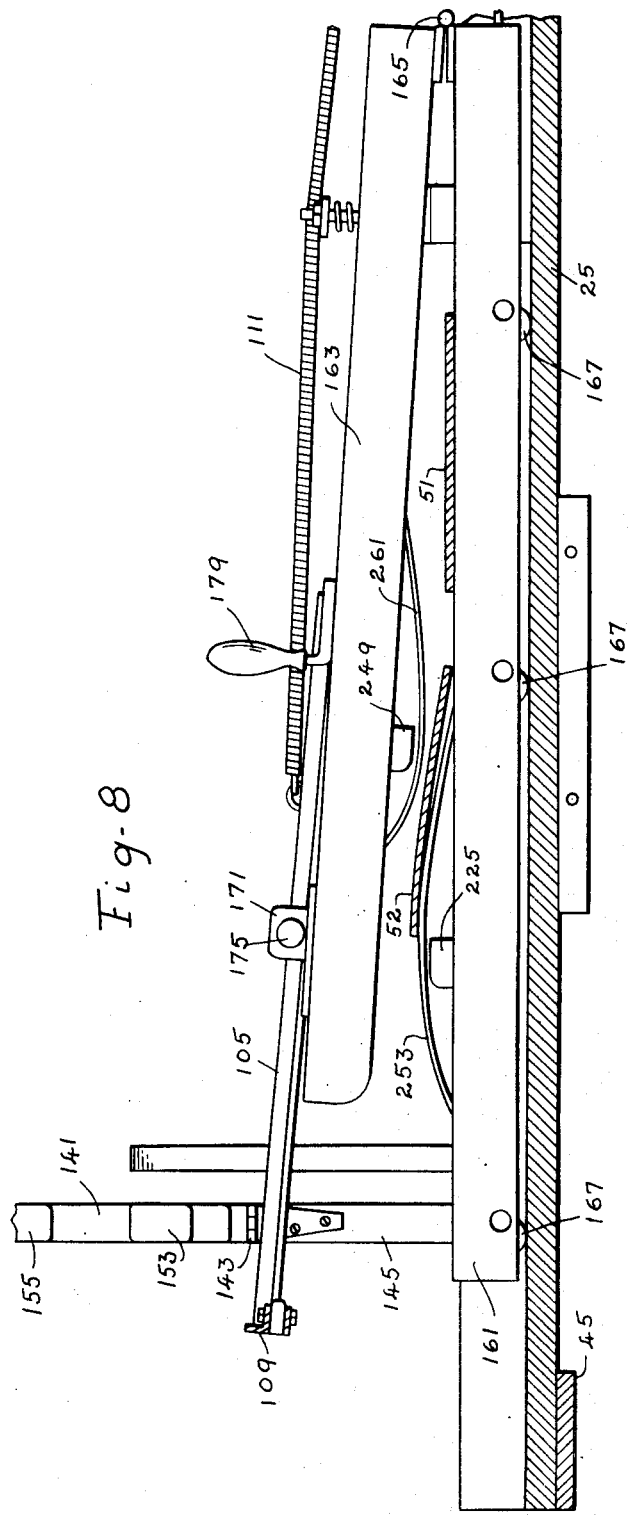
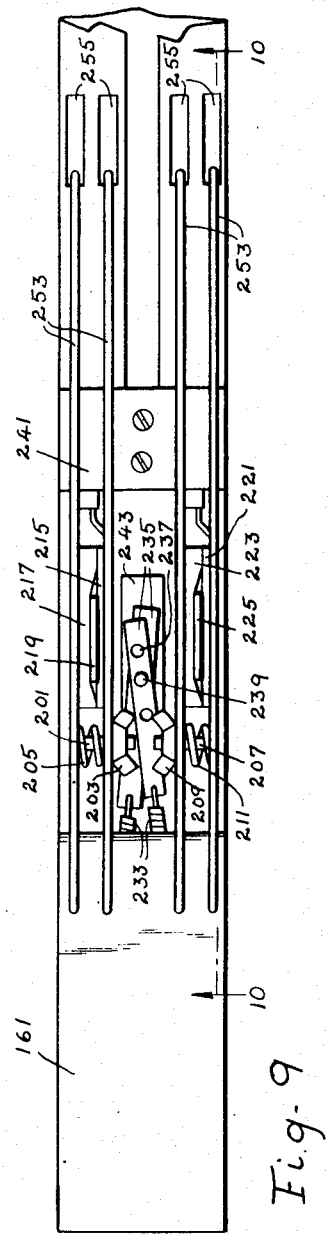
INVENTOR.
George R. McAllaster
BY
Charles Shepard
ATTORNEY Nov. 10, 1953 G. R. McALLASTER 2,658,276
MECHANISM FOR MARKING AND CUTTING TROUSERS
Filed Sept. 30, 1950 5 Sheets-Sheet 5

INVENTOR.
George R. McAllaster
BY
Charles Shepard
ATTORNEY

Patented Nov. 10, 1953

2,658,276

UNITED STATES PATENT OFFICE 2,658,276

MECHANISM FOR MARKING AND CUTTING TROUSERS

George R. McAllaster, Rochester, N. Y.

Application September 30, 1950, Serial No. 187,762

7 Claims. (Cl. 33—32)

The present invention relates to the art of tailoring, and more particularly to that branch of the art which deals with the making of trousers.

It is customary in the manufacture of trousers, particularly those of the ready made variety, to make the trousers initially of the maximum length decided upon by the manufacturer, and to leave the bottom ends unfinished when the trousers are supplied to the retail store. Then when the customer purchases the trousers, the tailor at the store makes the necessary measurements of the customer's body, on the basis of which measurements the alterations shop at the store finishes the trousers to the proper length for that particular customer, the finishing operation usually including the formation of cuffs at the lower ends of the trouser legs. The finishing involves the transverse cutting of the trouser legs at the proper point, and, in addition, when cuffs are to be formed, it involves the marking of two chalk lines transversely across both sides of both trouser legs, spaced upwardly from the cutting line, which chalk lines are the lines on which the material is folded in order to make the desired cuffs. If the cutting is to be performed by hand shears, a third chalk line must be drawn on both sides of both legs of the trousers, to form a guide line for cutting.

An object of the present invention is the provision of simple and effective mechanism for marking the required chalk lines at the proper positions on the trouser legs, more expeditiously than can be done by the conventional hand methods.

Another object is the provision of mechanism for drawing both of the needed chalk lines, on both sides of both legs of the trousers, during a single cycle of operation of the mechanism.

Still another object is the provision of mechanism which, in addition to marking the necessary chalk lines for folding the material will, during the same cycle of operation, preferably cut the trouser legs transversely at the proper points with relation to the chalk lines, so as to remove the excess material, and so as to avoid the necessity for drawing a separate chalk line at the place where the cloth is to be cut.

A further object is the provision of mechanism having some or all of the above mentioned desirable characteristics, which is at the same time sufficiently inexpensive to be economically feasible for use in ready made clothing stores of moderate size, and sufficiently simple to be operated readily and efficiently by comparatively inexperience employees of such stores.

These and other objects are accomplished by the construction disclosed as an illustrative embodiment of the invention in the following description and in the accompanying drawings forming a part hereof, in which:

Fig. 1 is a plan of the left hand portion of a machine in accordance with a preferred embodiment of the present invention, with the parts in open position ready to receive the legs of a pair of trousers to be marked;

Fig. 2 is a similar view of the right hand portion of the same machine, being a rightward continuation of Fig. 1, with some overlap;

Fig. 3 is a vertical section taken substantially on the line 3—3 of Fig. 1;

Fig. 4 is a front elevation of the parts shown in Fig. 2, and constitutes essentially a rightward continuation of the structure shown in Fig. 3, with some overlap;

Fig. 5 is a plan similar to Fig. 1, but showing the parts in closed position to clamp the legs of the pair of trousers to be marked, and with the shuttle moved leftwardly from its normal rest position, to effect the marking;

Fig. 6 is a vertical section taken approximately on the line 6—6 of Fig. 1;

Fig. 7 is a vertical section taken substantially on the line 7—7 of Fig. 5, illustrating the construction of an expansion hinge or compensating hinge constituting part of the apparatus;

Fig. 8 is a side elevation of the left hand portion of the machine as the parts are being released after a marking operation, illustrating the means for holding the marking chalks out of contact with the trouser legs during the return movement of the shuttle to normal rest position;

Fig. 9 is a plan on a larger scale of the lower part of the shuttle, illustrating details of the chalk holders and of the means for holding the trousers away from the chalk during the return stroke.

The same reference numerals throughout the several views indicate the same parts.

Figure 10:
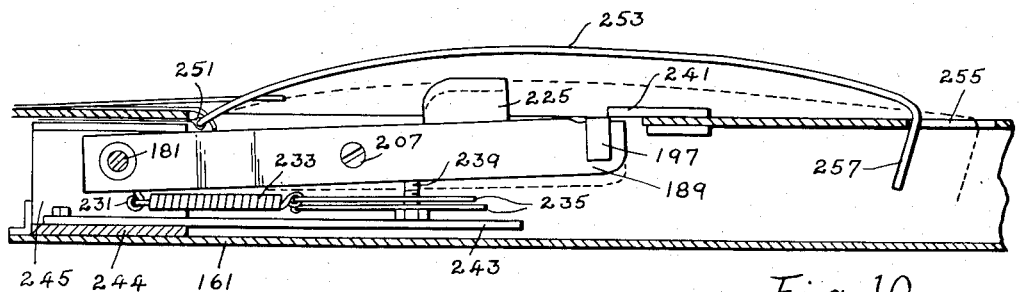
Fig. 10 is a vertical section taken approximately on the line 10—10 of Fig. 9.

To give first a brief outline of the major features of the construction as an aid to quick comprehension of the invention, the present construction may be said to include, in general, (1) clamping means by which both legs of a pair of trousers may be suitably clamped in fixed position, the clamping means preferably being part of or being associated with a table forming a convenient supporting surface for the trousers; (2) a shuttle having two parts connected to each other, the lower part of the shuttle moving back and forth below the clamped legs of the trousers and the upper part of the shuttle moving back and forth above the clamped legs of the trousers; (3) suitable chalk holding means for securing two marking chalks to the lower part of the shuttle and two marking chalks to the upper part of the shuttle, so that upon a single traverse of the shuttle across the clamped legs of the trousers, two chalk lines will be drawn across the under surfaces of both legs of the trousers and two chalk lines will concomitantly be drawn across the upper surfaces of both legs of the trousers; (4) guard means for holding the cloth of the trousers slightly away from the path of travel of the chalks during the return stroke or restoring movement of the shuttle, to avoid smudging of the lines previously drawn on the forward stroke and to avoid any possibility of the chalks catching on the edges of the trousers during the return stroke; and (5) a motor driven cutting blade mounted on the shuttle or on a separate carriage operatively connected to the shuttle, to cut off the surplus cloth from the lower ends of both legs of the trousers as the shuttle makes its stroke. The foregoing brief outline refers to the mechanism in its complete and preferred form, and is not to be construed as a statement of the minimum essential parts of the invention, for obviously it is within the broad scope of the invention to use some of these features without others (although the conjoint employment of all of these features is preferred at present) and it is also within the scope of the invention to make substantial variations in the details of each one of these features.

These features above mentioned will now be described under appropriate headings for the sake of quick and easy reference.

*Clamping Means*

Referring now to the drawings, and especially to Figs. 1, 3, 5, 7, and 12, the clamping means comprises a lower clamping assembly, mainly of stationary parts, and an upper clamping assembly movable down onto the lower clamping assembly to clamp the trousers between them. The lower assembly includes a pair of lower clamping bars 21 and 23, each of an elongated nature and laterally spaced from each other on a supporting base 25. The rear clamping bar is preferably of hollow or channel-like metal construction, and may conveniently be secured to the base 25 by bolts 27 extending through the base and through holding blocks 29 within the hollow parts of the clamping member, so that by loosening the bolts 27, the bar 21 may be slightly adjusted toward or away from the bar 23.

The lateral spacing between the two clamping members is for the purpose of providing space for operation of the lower part of the shuttle, to mark the chalk lines on the lower surfaces of the trousers while being held in the clamping means. When the trousers are being laid in the clamping means preparatory to marking and cutting, however, there might be some accidental sagging of the trousers into this space between the clamping members 21 and 23, and so it is desired to close this space temporarily, so as to provide a substantially continuous and smooth surface on which the trousers may be laid. For this purpose, there is placed between the two clamping members 21 and 23 a movable supporting plate 31 (Fig. 3) supported from beneath by a pair of link arms 33 parallel to each other as shown, and constantly urged by a coil tension spring 35 in a direction rightwardly when viewed as in Fig. 3, until the right hand one of the arms 33 hits against a limiting stop 37 preventing further rightward movement. In this position of the parts the top surface of the supporting member 31 is substantially flush with the top surfaces of the clamping members 21 and 23, so as to increase the supporting area available for holding the trouser legs when they are first placed in the mechanism. However, when the marking and cutting shuttle moves in its stroke from right to left when viewed as in Fig. 3 it will, as explained hereafter, contact with the right end of this supporting member 31 and move this supporting member leftwardly against the tension of its spring 35 until this supporting member assumes the lower or dotted line position shown in Fig. 3, whereupon the shuttle rides over this supporting member. When the shuttle is retracted, the spring 35 restores the supporting member upwardly to its initial position.

The supporting member 31 need not occupy the full width of the slot or space between the lower clamping members 21 and 23. For the purpose of preventing undesirable sagging of the trousers when they are laid across the lower clamping assembly, it is quite sufficient if this temporary supporting member 31 is relatively narrow and occupies only a fraction of the space, such as indicated in Fig. 1, or even narrower.

For the sake of more secure clamping of the trouser legs, the upper surfaces of the clamping members or rails 21 and 23, in those regions on which the trouser legs are laid, are preferably furnished with a covering or pad 41 of material, such as thick rubber sheeting, or sand paper, which has a high coefficient of friction.

This assemblage of base 25, clamping members or rails 21 and 23, and associated parts thus far described, is supported in any suitable way, such as from the supporting brackets or frame members 45, so as to be adjacent to the supporting surface of a table or bench preferably so located as to be at the same elevation with, and to extend closely adjacent to, the top surface of the resilient pad 41.

Extending across the pads 41, perpendicular to the direction of movement of the shuttle, are guide strips 47 to assist in alining the trouser legs at the proper angle. A center guide 49 also is used to indicate the midpoint between the two trouser legs.

The trouser legs are laid across the lower clamping members 21 and 23 (that is, across the resilient pad on these members) in side by side relationship to each other as indicated at 51 and 52 in Figs. 1 and 5 and as explained in greater detail hereafter. Then a guide bar and temporary retaining bar is used for positioning the trousers accurately on the lower clamping assembly, after which the upper clamping assembly is brought down tightly onto the lower clamping assembly to clamp the trousers firmly.

Figure 13:
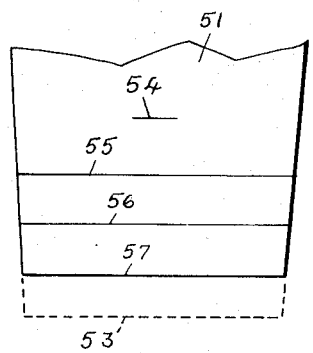
Fig. 13 is a diagrammatic view of the lower end of one leg of a pair of trousers in unfinished condition, to illustrate the chalk lines marked by the present machine and the cut made by the present machine.

First to explain the need for and advantages of the guide bar or positioning bar, reference is made to Fig. 13, being a diagrammatic representation of the lower part of one leg of a pair of trousers, which may be the leg 51. Originally, as supplied by the manufacturer to the retail clothing store, this trouser leg has the full length indicated in dotted lines at 53. When the alterations tailor at the retail store measures the customer who is purchasing the trousers, he determines the length that the trousers should be, for this particular customer. Then the chalk mark 54 is made on each leg of the trousers to indicate the exact bottom edge of the trousers when they are finished. But beyond this mark 54, material must be left for the cuff which is conventionally formed at the bottom of the trouser leg, and lines should be marked to assist the tailor in folding the material neatly and smoothly to form the cuff of the proper width. Also, although enough material for forming the cuff should be left beyond the chalk mark 54, excess material not needed for the cuff should be cut off in order to avoid a weighty and bulky lower end of the trousers. Transverse lines 55 and 56 are thus to be marked on each leg of the trousers to indicate the fold lines when making the cuffs, and the final cut off line 57 is the place where the excess material should be cut off.

Thus it is apparent that the location of the chalk mark 54 may vary on the material of the trousers, depending upon the height of the person purchasing the trousers. But, for any given style and width of cuff, once the location of the mark 54 has been determined, the location of the lines 55, 56, and 57 are all in fixed relation to each other and at a fixed distance from the chalk mark 54.

In the conventional methods used in hand tailoring, fourteen separate operations are necessary to accomplish what is done by the present machine. In the conventional system, the tailor lays the leg of the trousers down on a suitable surface such as a table, and measures the proper distance from the basic chalk mark 54 to the location for the line 55 and then draws this chalk line 55, being one operation. Next he measures the position for and draws the chalk line 56, being a second operation. Next he measures the position of and draws the chalk line at the cutoff line 57, being a third operation. Then he turns this leg of the trousers over and draws these same three lines 55, 56, and 57 on the other or reverse face of the trouser leg, these being the fourth, fifth, and sixth operations. Then with his shears he cuts off the excess material along the line 57, this being the seventh operation on this one trouser leg. Then he performs the same seven operations on the other leg of the same pair of trousers, making fourteen operations in all, to do what is done very quickly and accurately by the present mechanism.

In the use of the present mechanism, the same basic chalk mark 54 is drawn, as before, to indicate the extreme lower edge of the trousers in their finished condition. Then using this mark 54 as a guide, the operator places the marked leg of the trousers across or transversely to the lower clamping bars 21 and 23 (and across the temporary supporting member 31 which is in its elevated position at this time) and pulls down, into position across the trouser legs, the guide bar and temporary retaining bar 61.

This bar 61 is a metal bar in the nature of a straightedge. As best seen in Figs. 1, 3, and 6, the left end of the bar (or of an extension 63 secured to the left end of the bar, in the specific form here shown) is pivoted at 65 to a hinge member 67 which is mounted to swing on the horizontal hinge pivot or pintle 69. The pivot pin 65 extends through the hinge member 67 and projects below it as indicated at 71 (Fig. 6) where it is secured to one end of a coil tension spring 73, the other end of which is anchored at 75. Thus the spring 73 constantly tends to tilt the bar 61 upwardly to its dotted line position shown in Figs. 3 and 6, and the spring is sufficiently strong to hold the bar in an up-tilted position when no depressing force is applied to the bar. At the same time, the bar may be oscillated rearwardly or forwardly on its pivot 65, to such extent as allowed by two stop pins or limit pins 66 fixed to the hinge 67. At the right hand end of the bar 61, just to the right of the position for the right hand one of the trouser legs 51, there is mounted on the top surface of the clamping bar 21 a metal clip 79 open at its rear side so that the end of the bar 61, when properly depressed against the force of the spring 73, may be slid laterally forwardly into the open side of this clip 79, into a position in which a short pin 81 extending upwardly from the end of the bar 61 comes up through a small hole 83 in the top of the clip 79, to position the bar 61 accurately in a location wherein the front edge of the bar, acting as a straightedge, is exactly parallel to the front edge of the clamping bar 21 and to the path of travel of the marking shuttle to be described hereafter.

Both legs of the trousers are spread out flat, side by side, across the top surface of the lower clamping members 21 and 23, in such position that the chalk mark 54 on each leg of the trousers will come at the proper location at the front edge of the bar when the bar 61 is placed as a guide, the initial positioning being made by the eye of the operator. Then the operator brings down the bar 61 from the dotted line position to the full line position of Fig. 3, and inserts the right hand end of this bar into the open side or slot of the catch 79, and in this position the forward edge of the bar serves as a guide for determining the exact location of the chalk marks 54. If necessary, the trouser legs are slightly readjusted on the apparatus so that the chalk line 54 will be exactly at the forward edge of the guide bar 61. Small rubber pads 85 may be secured to the under surface of the bar 61 to bear on the top surfaces of the legs of the trousers to avoid any accidental slipping.

After the trouser legs have been accurately located on the lower clamping means with the aid of this locating or guiding and temporary holding bar 61, the main clamping members of the upper clamping assembly are brought down on top of the trouser legs to hold them very firmly and rigidly. These main upper clamping members comprise the elongated bars 91 and 93 of about the same cross sectional dimensions as the lower clamping bars 21 and 23, and arranged, when swung down, to overlie the respective lower bars 21 and 23. These upper bars 91 and 93 are hinged at their right hand ends on the hinges 95 and 97, respectively, to stationary members 99 and 101, respectively, the stationary members and the clamping bars 91 and 93 being laterally separated from each other just as are the lower clamping bars 21 and 23, to provide a space between them through which the shuttle may operate.

Angle bars 105 and 107 are respectively secured to the upper surfaces of the upper clamping bars 91 and 93, extending longitudinally along these clamping bars as seen in Fig. 5 and projecting leftwardly beyond the left ends of the clamping bars, and at their extreme left ends the two angle bars 105 and 107 are rigidly secured to each other by a cross piece 109 which serves also as a handle for lifting the principal parts of the upper clamping assembly. A spring 111, secured at its left end to the clamping bar 91 at 113, and secured at its right end to a bracket 115 (Fig. 2) on the fixed member 25, tends to pull the upper clamping assembly upwardly and to the right on its hinges 95 and 97. This spring lies slack when the clamping bar is thrown back in an out-of-the-way position while the trousers are being placed on or removed from the mechanism, as shown fragmentarily in Figs. 2 and 4. When the operator grasps the handle 109, however, and moves it leftwardly and downwardly, the upper clamping assembly is brought down on top of the previously placed trouser legs and on top of the positioning and temporary holding bar 61, until thick pads 121 of resilient and readily compressible material such as rubber, mounted on the lower faces of the upper clamping bars 91 and 93, come down onto the top surface of the trouser legs and press and hold them firmly down onto the lower clamping bars 21 and 23. These resilient pads 121, are, of course, cut away in proper locations so as not to interfere with the bar 61.

Since it is desired always to be sure of clamping the trousers firmly throughout their entire width, both at the hinge end and at the opposite end of the clamping means, and in spite of any variations in thickness of the cloth, the hinges 95 and 97 of the upper clamping bars are made in a form which may be described as compensating hinges; that is, hinges which will compensate or allow for any reasonable differences in thickness of trousers and reasonable variations in manufacture of the clamping parts, yet maintaining a reasonably uniform pressure across the full widths of both legs of the trousers. The construction of these compensating hinges is best shown in Fig. 7, where it is seen that one hinge member 125 of the hinge 97 is rigidly secured in the usual manner to the fixed member 101. But the other hinge member 127 of this hinge 97 is secured to a block 129 which, in turn, is mounted on the lower ends of a pair of studs or posts 131 in the form of bolts extending upwardly through suitable openings in the clamping members 93. A coiled compression spring 133 surrounds each post 131, and presses downwardly on the clamping member 93 and upwardly on a washer 135 held on the upper end of the post 131 by the nut 137. Thus the entire clamping member 93 may, if necessary, rise somewhat relative to the hinge pivot 97, but the springs 133 constantly tend to push the hinged end of the clamping member 93 down firmly against the trouser legs, when the clamping means is in closed or clamping position. The other upper clamping member 91 has its hinge 95 formed of exactly the same construction.

At the left end of the upper clamping assembly there is a holding lever or clamping lever for more easy and convenient application of holding pressure to the clamping assembly while the shuttle is operated. One hand of the operator could, of course, remain in position pressing downwardly on the handle 109, during the operating stroke of the marking and cutting shuttle, but to make things a little more convenient for the operator and also to give increased clamping pressure, it is preferred to provide a clamping lever 141 (Figs. 5 and 12) having its rear end hinged at 143 to a fixed or stationary bracket 145. A coiled tension spring 147 has one end fixed to the bracket 145, the spring thence extending up over a hinged guiding portion 149 on the bracket and thence forwardly and downwardly to a connection 151 with the lever 141. This spring lightly tends to swing the lever 141 upwardly to the dotted line position shown in Fig. 12, but provides only enough force to overcome the weight of this lever. After the operator has brought the upper clamping assembly 91, 93, 109, etc., leftwardly and downwardly onto the tops of the trouser legs, he then grasps the lever 141, pulls it forwardly and downwardly so that downward feet or projections 153 and 155 on this lever press downwardly on the angle bars 105 and 107, respectively, and the operator holds this lever 141 downwardly by hand pressure applied to the forward or free end of the lever. Thus the clamping mechanism is held in firmly clamped position by relatively light pressure on the part of the operator, due to the leverage effect.

The shuttle

Mounted for reciprocation back and forth through the longitudinal space between the front and back parts of the clamping means, is a shuttle which, as above briefly mentioned, is in two parts, one part operating below the trouser legs to carry marking chalks for marking the bottom surfaces of the trouser legs, the other part operating above the trouser legs, to carry marking chalks for marking the top surfaces of the trouser legs. In a very general way, the shuttle is best seen in Fig. 8, and it comprises an elongated lower body 161 and an upper body 163, hinged to each other at their right hand ends by means of the hinge 165. The lower body is mounted on any suitable number of wheels or rollers 167 which roll on the bed 25 in the space between the rear clamping member 21 and the front clamping member 23 of the lower clamping assembly. The side walls of the clamping members 21 and 23 may serve as guides to contact fairly snugly with the side walls of the shuttle member 161 and hold it accurately in its intended path of travel. This lower shuttle body 161 is hollow, to provide space within it for receiving the lower chalk holding means, as will be described hereafter.

The upper body or part 163 of the shuttle is provided on its top near its left end with a bracket 171 for holding a transverse shaft 173 which overhangs the side walls of the shuttle and which carries rollers 175 which, in certain positions of the parts, ride on the angle bars 105 and 107 of the upper clamping assembly, acting as rails for these rollers.

Like the lower shuttle body 161, the upper shuttle body 163 is also hollow, to provide space for receiving the upper chalk holding means. When the clamping mechanism is in fully clamped position, the shuttle, which normally lies to the right of the trouser legs, is grasped by a handle 179 (Figs. 4 and 5) and is pulled leftwardly so that the chalks mounted in the upper and lower shuttle bodies (as hereafter described) will be drawn across both the upper and lower surfaces of the clamped trouser legs, and will draw the lines 55 and 56 on both the upper and lower surfaces. When the shuttle reaches the extreme left limit of its motion, the operator releases the handle 179, also releases and throws back the clamping lever or holding lever 141, and grasps the handle 109 of the upper clamping assembly to raise it on its hinges 95 and 97. As the operator starts to raise the upper clamping assembly, this lifts the left end of the upper shuttle body 163 because of the rollers 175 of the latter overlying the tracks 105 and 107 of the upper clamping assembly. As soon as the raising of the upper clamping assembly has progressed a little, the inclination of the tracks 105 and 107 becomes such as to cause the shuttle to move automatically rightwardly to its initial or rest position, so that the operator does not need to return the shuttle manually to such position.

*Chalk holding means*

The chalk holding means in each of the lower and upper shuttle parts 161 and 163 is essentially the same, so only the holding means in the lower shuttle part 161 will be described in detail.

Figure 11:
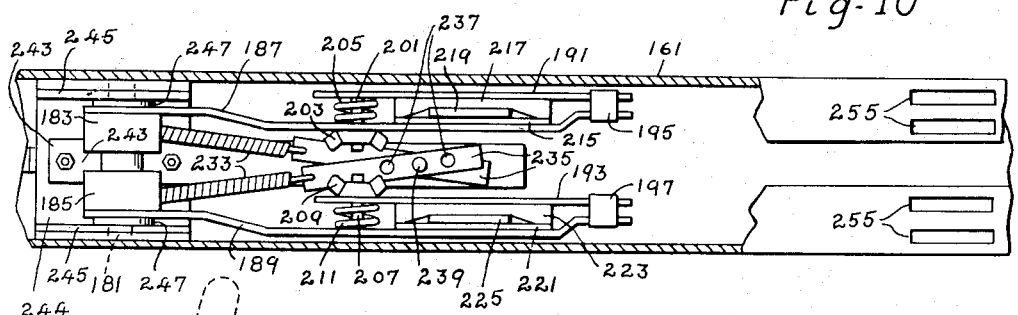
Fig. 11 is a view partly in plan and partly in horizontal section through the parts shown in Fig. 10, to illustrate additional details.

Referring now to Figs. 9, 10, and 11, the lower shuttle part or body 161, being hollow as above mentioned, is provided with a cross shaft 181 on which are rotatably mounted two hubs 183 and 185, having rightwardly extending arms 187 and 189, respectively, secured to them. Alongside each of these arms 187 and 189, throughout part of its length but not the entire length, is a bar 191 and 193, respectively. U-shaped clips 195 and 197, respectively, embrace the right hand ends of the members 187 and 191, and the members 189 and 193, respectively, to prevent lateral separation of these pairs of members at their right ends. These U-shaped clips may be removed for quick separation of the bars when the piece of chalk is to be renewed or repositioned. Near the left hand end of the bar 191 is a transverse stud 201 extending through a hole in the bar 187 and threaded at its end to receive a wing nut 203, a coil compression spring 205 surrounding the stud 201 between the two bars 187 and 191. Similarly, the bar or arm 189 has fixed to it a transverse stud 207 which extends through a hole in the bar 193 and is threaded at its outer end to receive a wing nut 209, and a coil compression spring 211 surrounds the stud between the two bars 189 and 193.

Between the bars 187 and 191, and intermediate between the clip 195 and the stud 201, there are located a relatively thin and slightly compressible rubber sheet or pad 215 and a substantially thicker and more compressible pad 217, such as of sponge rubber. Between these two pads is located the chalk 219, in the form of a relatively thin plate-like piece of hard or firm chalk of the kind commonly used by tailors. The upper edge of this chalk piece 219 projects upwardly substantially above the upper edges of the holding bars 187 and 191.

Similarly, between the other two chalk holding bars 189 and 193, there is the thin rubber pad 221 and the thicker and more compressible pad 223 of sponge rubber or the like, retaining between them the chalk piece 225 which, as before, extends upwardly a substantial distance above the top edges of its holding bars 189 and 193. As seen in Fig. 10, the upper left corner of this chalk piece 225 is substantially rounded rather than being sharp or angular, and the same is true of the other chalk piece 219 which lies directly behind the piece 225 in Fig. 10.

Due to the arms 187 and 189 being fixed to the hubs 183 and 185 which are rotatable on the cross shaft 181, it is apparent that both sets of the chalk holding arms can swing upwardly and downwardly in vertical planes. Each hub 183 and 185 has a lug or eye 231 extending downwardly below the shaft 181, and each of these lugs or eyes 231 is secured to the left end of a coiled tension spring 233, the right hand end of each spring being hooked into an opening in its own individual metal strip 235 which is provided with a series of holes 237, any one of which may be impaled at will on an upstanding stud 239 suitably secured in the shuttle body 161. The tension of these springs 233 will tend to turn the hubs 183 and 185 in a counterclockwise direction when viewed as in Fig. 10, and thus will constantly tend to raise the chalks 219 and 225 to press them against the lower surfaces of the trouser legs as the shuttle carries the chalks transversely across the trouser legs. If the line marked by the chalk is too faint, the operator can adjust the spring to greater tension by reaching inside the shuttle body and placing a different hole 237 of the strip 235 over the impaling pin 239, to pull the spring 233 tighter and thus to apply greater force to lift the chalk against the trouser legs. The maximum upward swing of the chalk-carrying arms is limited by a ledge or limit stop 241 on the shuttle body 161, which overlies the free ends of the arms.

The above mentioned post 239 is preferably mounted on a metal strip 243 which is separate from the body 161 and which is secured to a small flat plate 244 having upstanding flanges 245 which constitute bearings for the cross shaft 181, the parts 244—245 being slidable out of the shuttle body 161, so that the chalk holding parts constitute a sub-assembly readily removable from the shuttle.

When the chalk becomes worn down so that it should be repositioned to extend farther above the upper edge of its holding bars, or if it is necessary to renew the chalk piece entirely, the operator simply grasps the bars 187 and 191, or 189 and 193, as the case may be, near their right hand ends, and compresses them toward each other enough to permit removal of the clip 195 or 197, respectively, so that the bars may then be separated and the chalk may be repositioned or renewed. If the chalk should be clamped more firmly, the wing nut 203 and 209, as the case may be, is simply tightened.

In case it is desired to vary the spacing between the chalk lines 55 and 56, to provide for making the trouser cuffs wider or narrower, this may be done to some extent by reversing the thin and thick pads 215 and 217 (or 221 and 223, as the case may be) so that the thick pad lies on the opposite side of the chalk from the side on which it previously lay. Or if greater variation is needed, the spacing washers 247 (Fig. 11) between the bearing flanges 245 and the chalk carrying arms may be removed from those locations and be placed, instead, between the hubs 183 and 185; or various spacing washer combinations may be used between the flanges 245 and the arms 187 and 189, and between the two hubs 183 and 185. For such adjustments, the shaft 181 is readily removed longitudinally as soon as the chalk-holding sub-assembly is removed from the shuttle body.

As already indicated, the chalk holding mechanism for the upper shuttle part or body 163 may be constructed exactly the same way, and so need not be described in detail. As in the case of the lower chalk holding means, the cross shaft in the upper shuttle body lies to the left of the chalk pieces themselves, and the chalk holding arms extend rightwardly from this shaft, so that as the shuttle moves leftwardly on its effective or marking stroke, any undue resistance to the movement of the chalk, or catching of the chalk on the cloth, will tend automatically to shift the chalk upwardly away from the surface of the cloth (or downwardly, in the case of the lower chalk pieces) so as to relieve the catching or difficulty. The upper chalks are indicated in Fig. 8 at 249. The cross shaft of the upper chalk holding means is, however, positioned a little to the right of the cross shaft 181 of the lower chalk holding means, so that the upper chalks 249 are offset to the right of the lower chalks 219 and 225. Thus the upper chalks press down against the trouser legs where they are underlain and backed up by a solid flat surface of the top of the lower shuttle part, and the lower chalks press up against the trouser legs where they are overlain and backed up by a solid portion of the bottom surface of the upper shuttle part.

Guard means

It is desirable to avoid contact of the chalk with the trousers while the shuttle is being restored or returned rightwardly to its initial position. For this purpose, both the lower and upper shuttle parts 161 and 163 are provided with resilient guard means to tend to hold the trousers out of the path of travel of the chalks. The guard means is conveniently in the form of spring members, preferably of spring wire, tending to press the cloth away from the chalks, but capable of being displaced by slight pressure to allow the cloth to come into contact with the chalk at the proper time.

Referring especially to Figs. 8, 9, and 10, the lower shuttle body 161 is provided with a suitable bearing or journal 251 in which are mounted the laterally bent ends of the guard wires 253, four of which are provided, two lying on opposite sides of but closely adjacent to the plane of each of the chalks 219 and 225. The guard wires 253 are bowed so as to extend from their bearings 251 upwardly and rightwardly, normally in a position a little above the upper edges of the chalks 219 and 225, and on rightwardly a substantial distance beyond these chalks, the ends of each wire then being bent sharply downwardly and entering a guide slot 255 in the upper wall of the body 161. These ends which enter the guide slot are bent back upon themselves at a little more than a right angle, so that the downwardly projecting ends 257 (Fig. 10) somewhat underlie the top wall of the body 161, to resist any accidental upward disengagement of the right ends of the guide wires out of the slot 255.

When there is no downward pressure on these guide wires 253, they normally occupy the upwardly bowed position shown in full lines in Fig. 10, as well as in Fig. 8. When, however, there is any substantial resistance to such upward bowing, as when the shuttle is moved past the trouser legs while the trouser legs are firmly held in the clamping means, the trouser legs cannot yield in an upward direction, both because they are firmly clamped and because they are backed up by the flat surface of the opposite shuttle part, and so the resilient bowed guide wires 253 yield in a downward direction and flatten out to a position somewhat as shown in dotted lines in Fig. 10, and the chalks 219 and 225 are depressed to the dotted line position, and they firmly contact with and draw the markings or lines on the trouser cloth. But when the shuttle reaches the left end of its operating stroke, having drawn the necessary lines, the clamping means is released as above indicated, so that during the return or rightward stroke of the shuttle the trousers are no longer firmly clamped, and the cloth can give or can be displaced in an upward direction by the resiliency of the guard wires 253, with the result that on the return stroke these guard wires are in their normal or undisplaced positions and hold the cloth upwardly at an elevation above the chalk.

The upper guard wires 264 (Fig. 8) are formed exactly the same way and mounted exactly the same way in the upper shuttle body or part 163, except that the upper construction is, of course, turned upside down relative to the lower construction, so that the wires 261 are normally bowed downwardly rather than upwardly. But the function and operation is the same as in the case of the lower guard wires 253.

In addition to the functions above described, the guard wires also tend to hold the upper shuttle part slightly elevated so that the advancing left end of the upper part will not catch on the trousers. After it passes the edge of the trousers, the operator presses firmly down on the upper shuttle part during the rest of its leftward movement.

Cutting means

By a very simple change the shuttle could, of course, be made somewhat wider so as to accommodate three marking chalks instead of two, and the machine could thus be made to draw a third chalk line at the location 57 (Fig. 13), to serve as a guide for cutting off the excess cloth by a hand cutting operation. But instead of drawing this third chalk line, it is preferred actually to cut the cloth by means of this machine, so as to avoid the cutting by hand which the tailor would otherwise have to do. Hence the present machine is provided with motor driven cutting means which severs the cloth at the line 57 (without actually drawing any such line on the cloth) when the shuttle is operated.

Figure 12:
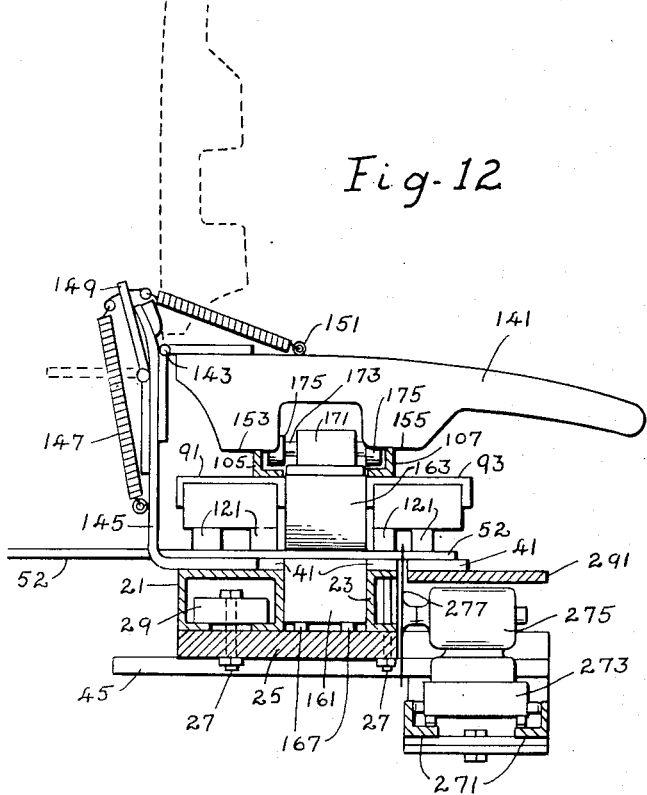
Fig. 12 is a transverse section taken approximately on the line 12—12 of Fig. 5.

In front of and slightly below the level of the base 25, the machine is provided with a longitudinal track 271 (Figs. 4 and 12) suitably and fixedly supported from any convenient framework (not shown in detail) so as to be exactly parallel to the direction of movement of the shuttle. The track is conveniently formed by a pair of angle bars mounted in parallel relation to each other, with one flange of each angle bar extending horizontally toward the other one (as seen in Fig. 12) and with the other flange or leg extending upwardly. A small carriage 273 is mounted for longitudinal movement along this track 271, being supported by bottom rollers and guided by side rollers engaging the flanges of the angle bars to eliminate any substantial lateral play of the carriage as it travels along the track.

On this carriage 273 is a small electric motor 275, the armature shaft of which is arranged at right angles to the direction of travel of the carriage, and the armature shaft projects rearwardly from the motor casing or housing and is provided at its rear end with a circular cutting blade 277 having sharp edges which, when the blade is being rapidly rotated, will cut through any reasonable thickness of cloth with which it comes into contact. The position of the various parts is such that, as seen in Figs. 4 and 12, the upper edge of the cutting blade 277 is just slightly above the horizontal plane of the trouser legs 51 and 52 when the latter are clamped in the clamping mechanism. Also, the blade 277 lies just in front of the front edge of the lower clamping bar 23, and at the proper distance from the plane of travel of the chalks so that it will cut the cloth at the line 57, relative to the chalk lines 55 and 56 which are to be drawn by the chalks.

The electric motor 275 may be supplied with current from any conventional flexible electric cord, not shown, plugged into a convenient electric outlet. The carriage 273 and its motor and cutting blade may be reciprocated back and forth by means of a separate handle as a separate operation, but in the preferred form of mechanism the motor carriage is operatively connected to the shuttle so that when the operator moves the shuttle, the motor carriage and cutting blade are automatically moved with it. To this end, a long and relatively stiff rod 281 (Fig. 4) is fixed to the carriage 273 and extends rightwardly therefrom, through various joints provided with adjustable clamps 283, to a sufficient rightward distance to clear the right end of a slot formed in the base 25 when the carriage 273 and the shuttle are in their extreme leftward positions. Then the connecting rod extends upwardly as at 285, to reach an elevation above the base 25, and then leftwardly as at 287 to an adjustable clamp connection 289 on the lower shuttle part 161. So whenever the shuttle is moved leftwardly, the rigid rod connection 281, 285, 287 will cause corresponding leftward movement of the carriage 273 and the cutting blade 277; and when the shuttle moves rightwardly through its return stroke, this will cause corresponding rightward movement of the motor carriage and cutting blade.

In order to provide an accurate and neat cut of the fabric, the cloth should be clamped on both sides of the cut, so that it is stretched taut in the place where the blade will engage it. It is seen from Fig. 12 that the trousers are clamped on both sides of the plane of operation of the blade 277. As there indicated, one rubber pad 121 on the upper clamping member 93 comes down onto the trousers to the rear of the blade 277 (that is, to the left of the blade when viewed as in Fig. 12) and another clamping pad 121 on the same member 93 comes down on the trousers a little to the front of the plane of the cutting blade, both of these rubber pads pressing the trousers firmly down onto the friction material 41 on the lower clamping assembly. To the rear of the plane of the cutting blade 277, the lower clamping member 23 is stationary. But in front of or forwardly of the plane of operation of the blade 277, it is desirable that the lower clamping member be movable in order to obtain access, when necessary, to the motor and cutting blade, for adjustment, sharpening, oiling, etc. Hence that part of the lower clamping assembly which is forwardly of the plane of operation of the blade 277 is in the form of a shelf or board 291 (Figs. 1, 4, 5, and 12) which is hinged at 293 to a stationary part 295 of the apparatus, and which, when the movable parts are retracted to their rightward position, may be swung upwardly on this hinge 293 to obtain access to the motor, cutting blade, etc. In its lower or normal position, the part 291 forms a forward continuation of the lower clamping mechanism, having a top surface which is level with that of the lower clamping bars 21 and 23, and part of the friction pad 41 overlies the member 291, other parts of this friction pad being on the top surfaces of the members 21 and 23. There is just a slight space or gap between the forward edge of the member 23 and the rear edge of the member 291, as well seen in Fig. 12. A metal guard 301 of inverted U-shape covers this space and protects against accidental contact with the blade, in the regions to right and left of the trouser legs, as seen in Fig. 1.

*Operation*

The operation of each part of the mechanism has been described in connection with the construction of that part. However, it may be convenient at this point to summarize briefly the operation of the mechanism as a whole.

The tailor after measuring the customer, marks the chalk mark 54 on both legs of the trousers, to indicate the extreme lower edge of the trousers in their finished condition. This marking 54 may be done in some other location, before the trousers are brought to the present machine, or it may be done at the location of the present machine, by the operator of this machine. As already indicated, the present machine is preferably mounted at the edge of a large bench or table which is flush with or at the same level with the pads 41 on the lower clamping assembly, and the legs of the trousers may be spread out and measured and the marks 54 may be placed thereon while on this table or bench immediately adjacent to the present machine, and the trouser legs may then be inserted into the present machine.

Assuming now that the clamping parts are in their open position, the trouser legs are laid substantially parallel to each other and across the lower clamping assembly of the machine as indicated in dotted lines at 51 and 52 in Fig. 1, with the right edge of each leg placed at the proper angle to its perpendicular guide strip 47. The operator, by his eye, judges the proper position of the trousers, and then swings the bar 61 down on its hinge 69, onto the top of the trousers, readjusting the position of the trousers if necessary so that the chalk lines 54 on both legs of the trousers lie exactly at the front edge of the positioning bar or guide bar 61, the right end of which is caught under and accurately positioned in the clip 79. When the trousers have been accurately positioned, the upper clamping assembly is swung down onto the lower clamping assembly, securely clamping both trouser legs between these two clamping assemblies. This is done by grasping the handle 109 of the upper clamping assembly and pulling it leftwardly and downwardly on the hinges 95 and 97, from a swung back position illustrated fragmentarily in Figs. 3 and 4 to a position down flat on the trousers as shown in Fig. 5 and in dotted lines in Fig. 3, and the clamping lever 141 is pulled forwardly and downwardly so as to come down on top of the arms 105 and 107 of the upper clamping assembly, pushing down on these arms to force the upper clamping assembly very firmly down onto the trousers and onto the lower clamping assembly. At this time, the compensating hinges 95 and 97 of the upper clamping assembly can give a little, so as to make sure that the trousers are thoroughly clamped throughout the entire width of the trouser legs and to insure that the thickness of the trousers near the hinges 95 and 97 will not prevent the far end of the upper clamping assembly from coming all the way down onto the trousers. A guide 305 (Figs. 1 and 3) helps to aline the clamping assembly accurately as it comes down.

The operator then grasps the handle 179 of the shuttle (which has been at its extreme right hand position) and pulls this handle one full stroke leftwardly as far as it will go, its limit of motion being defined by contact with the bumper or abutment 309 (Fig. 5). The left end of the shuttle hits the right end of the support member 31 and swings this support member leftwardly and downwardly, against the force of its spring 35, so that the shuttle passes over it. During this leftward stroke of the shuttle, the chalks 219 and 225 will draw the two chalk lines 55 and 56 across the lower surfaces of both legs of the trousers, and the other chalks 249 mounted in the upper shuttle body 163 will likewise draw the lines 55 and 56 across the upper surfaces of both legs of the trousers. Concomitantly with the drawing of these chalk lines, the motor carriage 273 will be traversed leftwardly by means of its connection 281, 285, etc., with the shuttle, and the rapidly rotating cutting blade 277 driven by the motor 275, will cut off the excess cloth at the lower ends of both legs of the trousers, making the cut along the line indicated diagrammatically at 57 in Fig. 13.

At the conclusion of this leftward stroke, both legs of the trousers will have been severed to remove excess material, and both legs will have been marked on both sides with the necessary chalk lines to enable a tailor to form the cuff accurately, neatly, and quickly. The operator lets go the handle 179 of the shuttle at the conclusion of the leftward stroke, and lifts the clamping lever 141 to its upstanding position shown in dotted lines in Fig. 12, in which position it is retained by the springs 147. Then he grasps the handle 109 of the upper clamping assembly and lifts this handle. The lifting of the upper clamping assembly also lifts the upper shuttle body 163 because of the shuttle body wheel 175 overlying the upper clamping assembly, and as soon as the angularity or pitch of the upper clamping assembly reaches a sufficient magnitude, the shuttle automatically runs rightwardly or down hill, restoring itself and the cutting mechanism to their initial or rest positions. As the shuttle moves rightwardly, the trouser legs by this time having been unclamped, the now loose fabric is deflected by the guard wires 253 and 261 of the shuttle so that the chalks 219, 225, and 249 do not contact with the fabric of the trousers on the return stroke. Thus the line previously drawn during the leftward stroke is not smudged or blurred during the return stroke.

About the time the shuttle reaches the rightward limit of its travel to its normal rest position, the operator, continuing the lifting of the handle 109 of the upper clamping mechanism, has gotten this upper clamping mechanism rather fully opened, throwing it back to some such position as indicated fragmentarily in Figs. 3 and 4. The bar 61 is then unhooked at its right end from the clip 79, and elevated to the dotted line position shown in Figs. 3 and 6, in which upstanding position it is held by the spring 73. The trouser legs are now fully released from the machine, ready to be lifted off and handed to the tailor who is to fold and sew the cuffs. The next pair of trousers may now be placed in the machine and the operation may be repeated.

In ready made clothing stores which do a substantial volume of business, the present machine is a very simple, satisfactory, economical, and speedy way of marking and cutting the trouser legs to the dimensions of the individual customer, as must be done every time a pair of trousers is sold. The time saved as compared with the conventional tedious methods of hand marking and hand cutting can well be imagined, where a large volume of such work is handled.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims. Also it will be appreciated that many of the principles and features of construction may be advantageously applied to mechanism for marking or cutting things or articles other than trousers; e. g., other articles of clothing, as well as articles made of wood, metal, fabric, etc., in general.

What is claimed is:

1. Apparatus for marking the legs of trousers, including means comprising a supporting bed for holding both legs of a pair of trousers in flat condition in side by side relation to each other, reciprocating means mounted for reciprocation in a path of travel transverse to the legs of said trousers when so held, chalking means mounted on and movable bodily with said reciprocating means for marking a plurality of parallel chalk lines on both the upper and lower surfaces of both legs of said trousers during a single reciprocation of said reciprocating means, friction surface clamping means for contacting with said trouser legs to clamp them substantially immovably during the marking of said chalk lines, a shiftable guide bar pivoted at one end to said supporting bed on one side of said trouser legs and adapted to be swung to a position overlying said trouser legs to assist in placing them in position for clamping by said clamping means, and latching means on said bed on the opposite side of said trouser legs for latching the opposite end of said guide bar.

2. Apparatus for marking the legs of trousers, including clamping means for holding both legs of a pair of trousers relatively taut in flat condition in side by side relation to each other, a shuttle mounted for reciprocation in a path of travel transverse to the legs of said trousers when so held, said shuttle having a lower part movable in a path below said trouser legs and an upper part movable in a path above said trouser legs, said lower and upper parts of said shuttle being hinged to each other to be opened relative to each other for easier placement of the trouser legs, and separate chalking means on each shuttle part including a clamp for holding a piece of chalk in position to be drawn across the trouser legs as the shuttle is reciprocated, a lever on which said chalk clamp is mounted, said lever being pivotally mounted on its respective shuttle part, and spring means tending to swing the lever to press the chalk resiliently against the trousers.

3. Apparatus as defined in claim 2, further including a resilient guard tending to hold the trousers away from the chalk, said guard being resiliently shiftable to an ineffective position by the pressure of the trousers when the latter are clamped in said clamping means.

4. Apparatus as defined in claim 3, further including an interconnection between said clamping means and said shuttle to tend to open the shuttle parts relatively to each other when said clamping means is unclamped.

5. Apparatus as defined in claim 4, in which the unclamping of said clamping means also tends to move said shuttle toward one end of its path of travel.

6. Apparatus as defined in claim 5, further including a motor, a rotary cutting blade driven by said motor, and means interconnecting said blade to said shuttle to move the blade across the legs of the trousers to cut said legs when the shuttle is reciprocated.

7. Apparatus as defined in claim 6, in which said clamping means clamps said trouser legs tightly on both sides of the path of travel of said blade during a cutting movement thereof.

GEORGE R. McALLASTER.

References Cited in the file of this patent

UNITED STATES PATENTS

| Number | Name | Date |
|---|---|---|
| 554,677 | Gury | Feb. 18, 1896 |
| 1,578,477 | Smith et al. | Mar. 20, 1926 |
| 1,605,349 | Jocque et al. | Nov. 2, 1926 |
| 1,742,047 | Moss | Dec. 31, 1929 |
| 1,986,791 | Butts | Jan. 8, 1935 |
| 1,999,063 | Smith | Apr. 23, 1935 |
| 2,083,577 | Perry | June 15, 1937 |